US006685249B2

(12) United States Patent
Schneider

(10) Patent No.: US 6,685,249 B2
(45) Date of Patent: Feb. 3, 2004

(54) SYNCHRONIZED SLIDE-OUT MECHANISM

(75) Inventor: Robert H. Schneider, Beaver Dam, WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 10/378,030

(22) Filed: Feb. 28, 2003

(65) Prior Publication Data

US 2003/0141732 A1 Jul. 31, 2003

Related U.S. Application Data

(63) Continuation of application No. 09/564,663, filed on May 3, 2000, now Pat. No. 6,601,896, and a continuation-in-part of application No. 08/823,170, filed on Mar. 25, 1997, now Pat. No. 6,116,671, which is a continuation-in-part of application No. 08/563,043, filed on Nov. 27, 1995, now Pat. No. 5,758,918

(60) Provisional application No. 60/132,397, filed on May 4, 1999.

(51) Int. Cl.[7] .............................................. B62D 33/08
(52) U.S. Cl. ................. 296/26.01; 296/26.09; 296/26.13; 296/165
(58) Field of Search ................. 296/26.01, 26.02, 296/26.03, 26.04, 26.05, 26.08, 26.09, 26.12, 26.13, 165, 171, 172, 175, 35.3, 161

(56) References Cited

U.S. PATENT DOCUMENTS

| 1,419,475 A | 6/1922 | Smith |
| 1,471,549 A | 10/1923 | Clement |
| 1,521,635 A | 1/1925 | Lewis |
| 2,147,892 A | 2/1939 | Gay ................................. 20/2 |
| 2,581,192 A | 1/1952 | La Fleur |
| 2,842,972 A | 7/1958 | Houdart ....................... 296/26 |
| 2,902,312 A | 9/1959 | Ferrera |
| 3,137,041 A | 6/1964 | Mullen ............................. 20/2 |
| 3,169,280 A | 2/1965 | Jarman |
| 3,181,910 A | 5/1965 | Thomas ....................... 296/23 |
| 3,482,716 A | 12/1969 | Leadley ....................... 214/75 |
| 3,596,416 A | 8/1971 | Hojka |
| 3,672,238 A | 6/1972 | Young et al. ................. 74/89.2 |
| 3,884,520 A | 5/1975 | Peterson ....................... 296/27 |
| 4,128,269 A | 12/1978 | Stewart |
| 4,133,571 A | 1/1979 | Fillios ......................... 296/23 |
| 4,139,229 A | 2/1979 | Cooper ......................... 296/23 |
| 4,192,544 A | 3/1980 | Patterson ..................... 296/165 |
| 4,197,600 A | 4/1980 | Slabic ........................... 5/118 |
| 4,253,283 A | 3/1981 | May |
| 4,270,791 A | 6/1981 | Tann ........................... 296/171 |
| 4,358,133 A | 11/1982 | Stucky ......................... 280/656 |
| 4,362,329 A | 12/1982 | Laube et al. ................... 296/26 |
| 4,413,855 A | 11/1983 | Flanagan |
| 4,480,866 A | 11/1984 | Komatsu |

(List continued on next page.)

FOREIGN PATENT DOCUMENTS

| EP | 0 083 317 | 7/1983 | |
| FR | 1084747 | 1/1955 | |
| FR | 1 574 680 | 6/1969 | ................. 296/171 |
| GB | 485330 | 5/1938 | |

Primary Examiner—Joseph D. Pape
Assistant Examiner—Lori L Coletta
(74) Attorney, Agent, or Firm—Quarles & Brady LLP

(57) ABSTRACT

An operating mechanism for extending a slide-out section of a vehicle includes a pair of rail supports secured to a vehicle frame and a pair of rail members connected to the slide-out section with one rail member slidably engaging each rail support. Each rail member is driven by its own rack and pinion arrangement. A shaft connects the pinions so that movement of the rail members is synchronized using a single drive unit. A pair of rollers are mounted to each rail support, one roller on each side of the racks, to support the rack relative to the associated pinion.

6 Claims, 4 Drawing Sheets

U.S. PATENT DOCUMENTS

| | | | |
|---|---|---|---|
| 4,500,132 A | 2/1985 | Yoder | 296/171 |
| 4,557,518 A | 12/1985 | Maclean et al. | 296/156 |
| 4,657,300 A | 4/1987 | Penny et al. | 296/173 |
| 4,861,049 A | 8/1989 | Losi | 280/47.16 |
| 4,869,030 A | 9/1989 | Clark | |
| 4,874,197 A | 10/1989 | Grable | 296/162 |
| 4,883,306 A | 11/1989 | Stucky | |
| 4,930,837 A | 6/1990 | Marsh et al. | 296/165 |
| 4,950,123 A | 8/1990 | Brockhaus | |
| 4,955,661 A | 9/1990 | Mattice | 296/171 |
| 4,960,299 A | 10/1990 | Steadman | 296/26 |
| 5,050,927 A | 9/1991 | Montanari | |
| 5,090,749 A | 2/1992 | Lee | 296/171 |
| 5,092,650 A | 3/1992 | Perlot | |
| 5,125,202 A | 6/1992 | Kissinger | 52/239 |
| 5,127,697 A | 7/1992 | St. Marie | |
| 5,154,469 A | 10/1992 | Morrow | 296/26 |
| 5,170,901 A | 12/1992 | Bersani | 220/1.5 |
| 5,193,878 A | 3/1993 | Weaver | 296/162 |
| 5,237,782 A | 8/1993 | Cooper | |
| 5,248,180 A | 9/1993 | Hussaini | |
| 5,295,430 A | 3/1994 | Dewald, Jr. et al. | |
| 5,332,276 A | 7/1994 | Blodgett, Jr. | |
| 5,333,420 A | 8/1994 | Eden | 52/67 |
| 5,491,933 A | 2/1996 | Miller et al. | |
| 5,522,685 A | 6/1996 | Lessard | 296/26 |
| 5,544,998 A | 8/1996 | Malinowski | 296/26.09 |
| 5,791,715 A | 8/1998 | Nebel | 296/26 |
| 5,938,092 A | 8/1999 | Johnson | 296/26.08 X |
| 6,065,792 A | 5/2000 | Sciullo et al. | 296/26.09 |
| 6,120,235 A | 9/2000 | Humphries et al. | 296/26.12 X |
| 6,196,604 B1 | 3/2001 | Hoh et al. | 296/26.05 |

SYNCHRONIZED SLIDE-OUT MECHANISM

CROSS-REFERENCE TO RELATED APPLICATIONS

This application is a continuation of U.S. patent application Ser. No. 09/564,663, filed May 3, 2000 now U.S. Pat. No. 6,601,896 which claims benefit to U.S. provisional patent application No. 60/132,397, filed May 4, 1999 and is a continuation-in-part of U.S. application Ser. No. 08/823,170, filed Mar. 25, 1997, now U.S. Pat. No. 6,116,671, which is a continuation-in-part of U.S. application Ser. No. 08/563,043, filed Nov. 27, 1995, now U.S. Pat. No. 5,758,918.

STATEMENT REGARDING FEDERALLY SPONSORED RESEARCH

Not Applicable.

BACKGROUND OF THE INVENTION

This invention relates to vehicles having extendable sections, and more particularly to an improved operating mechanism for moving a slide-out section between extended and retracted positions relative to the vehicle.

In order to increase the available interior space of recreational vehicles or trailers, it is known to provide a slide-out section (such as a bedroom) as part of the structure of the vehicle or trailer. A slide-out section is a raised platform enclosed on all but one side. During transit, the slide-out section is retracted and stored in the interior of the vehicle or trailer, with the exterior wall of the slide-out section approximately flush with the exterior of the vehicle or trailer. To use the slide-out section after the vehicle is parked and leveled, it is slid outward from the vehicle to an extended position, thereby increasing the interior space of the vehicle.

The operating mechanism for moving the slide-out sections are typically devised to push the slide-out section away from the vehicle when extending the slide-out section, and pulls the slide-out section towards the vehicle when retracting the slide-out section. The mechanism for moving the slide-out section relative to the vehicle is fixed to the vehicle body and can include one or more sliding rails attached to the slide-out section. Typically, these sliding rails slide within rail supports fixed to the vehicle frame. Multiple sliding rails are typically utilized for wide slide-out sections. To conserve cost and spaces, typically the sliding rails are driven by a single drive unit. Thus, in mechanisms having multiple sliding rails, one rail is directly driven by the drive unit and the other rail moves in response to sliding of the slide-out section to which it is connected. Due to friction or an obstruction, it is possible for either of the driven or free sliding rails to lag behind the other rail during extension and/or retraction. This can cause the room to become skewed with respect to the vehicle. If this is not corrected, it can cause excessive wear, motor fatigue and/or an incomplete seal between the slide-out section and the vehicle when fully extended or retracted.

SUMMARY OF THE INVENTION

The present invention provides a multiple rail synchronized operating mechanism for moving a slide-out section of a recreational vehicle between retracted and extended positions.

In particular, the operating mechanism includes a pair of rail supports spaced apart and secured to a vehicle frame and a pair of rail members connected to the slide-out section. One rail member slidably engages each rail support, and each rail member has a rack which meshes with an associated pinion. The pinions are coupled by a shaft to synchronize movement of the rail members with respect to the rail supports. An anti-friction member is mounted to each rail support.

In preferred forms, the anti-friction members are rollers rotatably mounted to the rail supports and engaging corresponding surfaces of the rail members. The rollers can define two roller surfaces, one on each side of the associated rack. Preferably, there are two pairs of rollers, one pair of rollers mounted to each rail support so that a rack is disposed between each pair of rollers.

The present invention thus provides a multiple sliding rail slide-out mechanism in which the sliding rails are synchronized. The rails are synchronized using a shaft to couple the pinions for each sliding rail. Synchronized movement of the rails allows the slide-out section to extend and retract substantially uniformly and prevents it from becoming skewed with respect to the vehicle.

The foregoing and other objects and advantages of the invention will appear from the following description. In the description, reference is made to the accompanying drawings which form a part hereof, and in which there is shown by way of illustration preferred embodiments of the invention.

DETAILED DESCRIPTION OF THE PREFERRED EMBODIMENTS

The present invention provides an expandable bedroom slide-out attached to a known trailer or recreational vehicle which provides distinct advantages over the prior art as will be described and appreciated hereafter. In the preferred embodiment, the trailer or recreational vehicle (generally referred to as the vehicle) is equipped with a slide-out section used to provide additional interior room space. However, it should be understood that the invention can also apply to expandable sections or compartments provided on other vehicles for use in construction, military, medical, education, mobile broadcast and other applications, to expand the inside volume of the vehicle.

Figure 1:
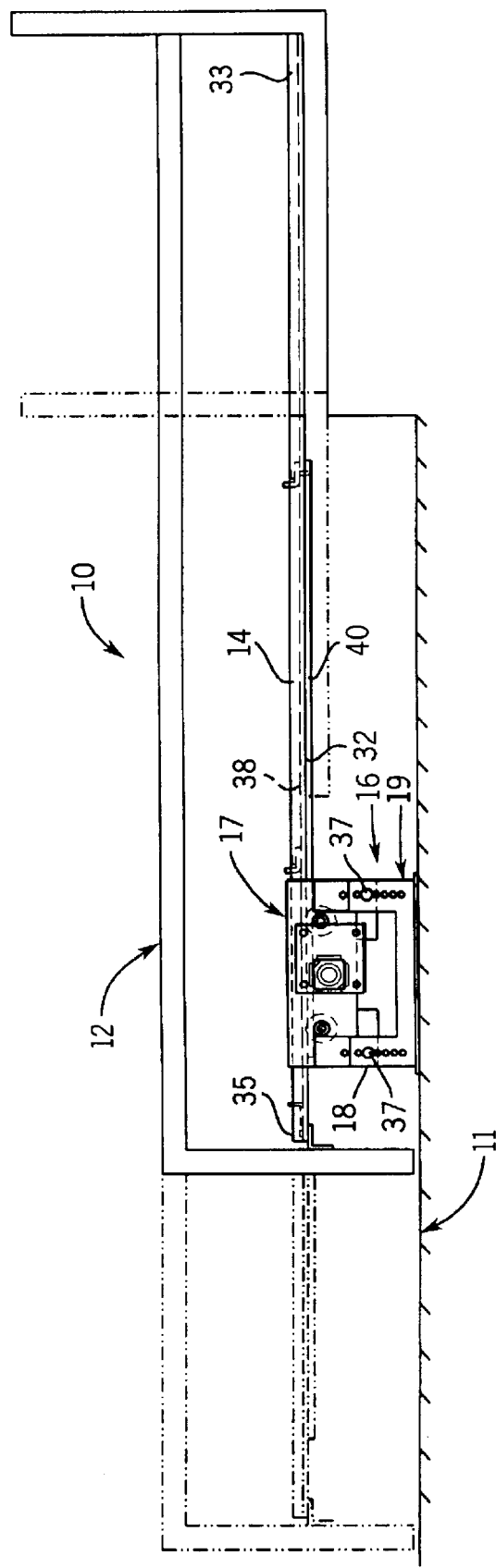
FIG. 1 is a side view of a vehicle stationary floor having a slide-out section incorporating the present invention.
Figure 2:
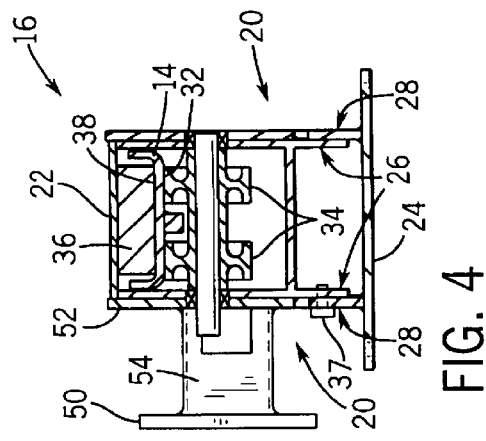
FIG. 2 is a side view of the slide-out actuator of FIG. 1 in a lower position.
Figure 3:
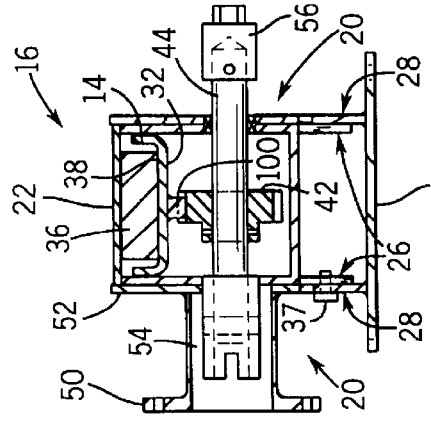
FIG. 3 is a cross sectional view of the slide-out actuator along line 3—3 of FIG. 2.
Figure 4:
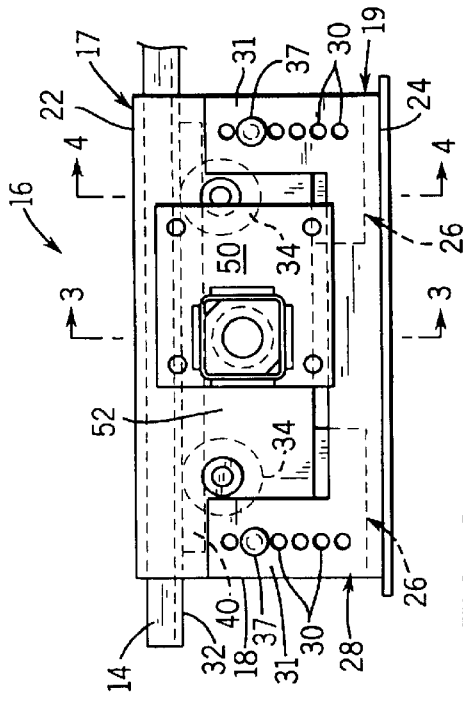
FIG. 4 is a cross sectional view of the slide-out actuator along line 4—4 of FIG. 2.
Figure 5:
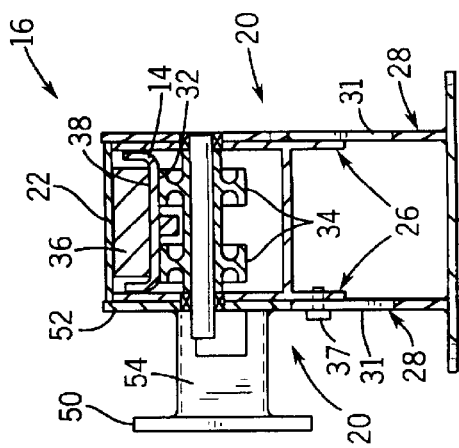
FIG. 5 is a side view of the slide-out actuator of FIG. 1 in an upper position.
Figure 6:
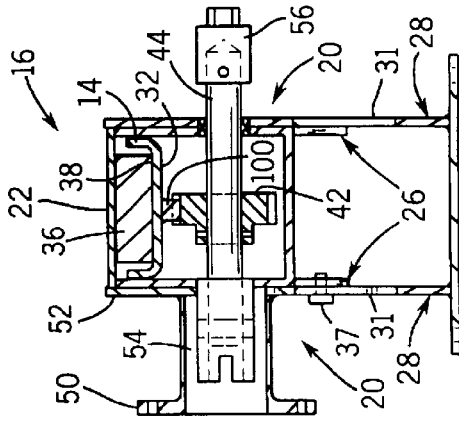
FIG. 6 is a cross sectional view of the slide-out actuator along line 6—6 of FIG. 5.
Figure 7:
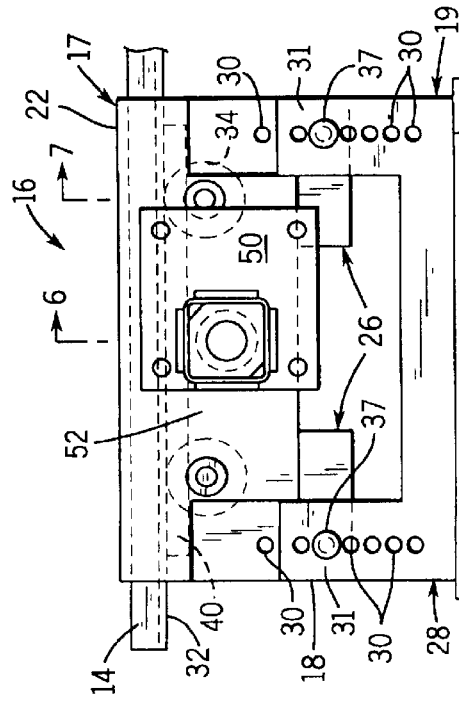
FIG. 7 is a cross sectional view of the slide-out actuator along line 7—7 of FIG. 5.
Figure 9:
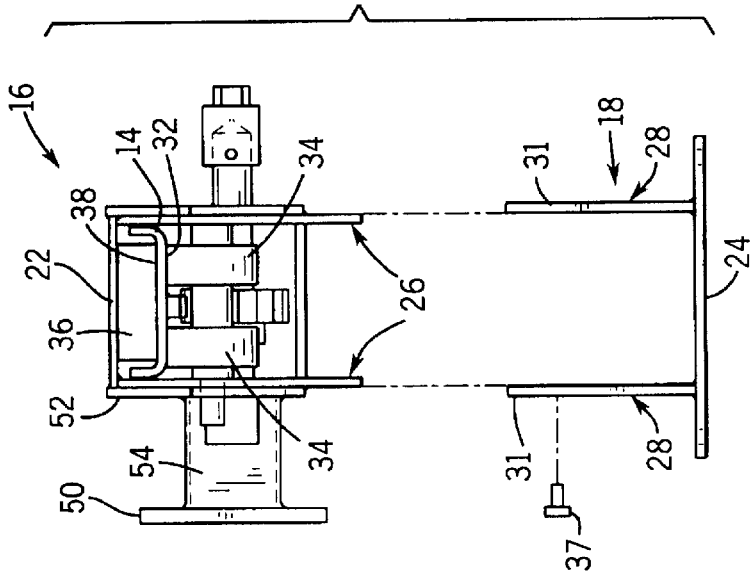
FIG. 9 is an exploded end view of the slide-out actuator of FIG. 1.
Figure 8:
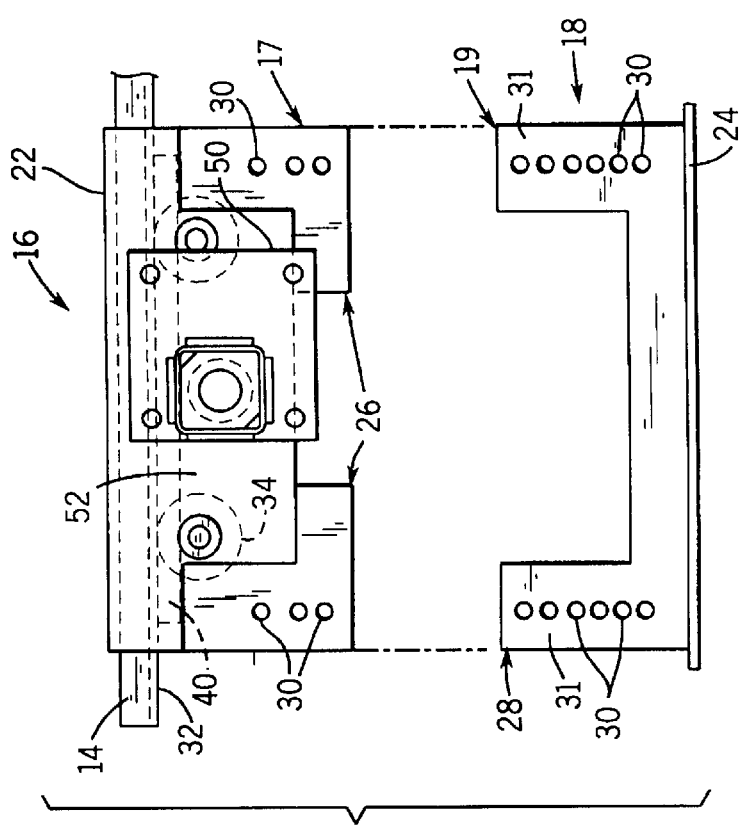
FIG. 8 is an exploded side view of the slide-out actuator of FIG. 1.

Referring now to FIG. 1, a bedroom slide-out 10 is mounted to a vehicle stationary floor 11. The bedroom slide-out 10 has a movable platform 12, such as suitable for use as a bed base, mounted to each end of a rail member, in this case a U-shaped channel 14. The U-shaped channel 14 is slidably mounted in an actuator 16 which forcibly moves the platform 12 between extended and retracted positions. The actuator 16 is rigidly mounted to the vehicle stationary floor 11, and extends and retracts the movable platform by forcibly sliding the U-shaped channel 14 with a rack and pinion drive. The moveable platform 12 is disposed above the actuator frame 18, and is mounted to both ends of the U-shaped channel 14.

The channel 14 is slidably disposed in the rail support or actuator frame 18, which simultaneously pushes and pulls the platform 12 to provide a smooth transition between the extended and retracted positions. The U-shaped channel 14 has a top surface 38, bottom surface 32, and the two ends 33, 35. A rack 40 mounted to the U-channel bottom surface 32 engages a pinion 42 rotatably mounted in the actuator 16 to urge the channel 14 in the desired direction.

As shown in FIG. 1, the slide-out actuator 16 has a rail support of frame 18 mounted to the vehicle floor 11. Looking particularly at FIGS. 3, 4, 6, and 7, the actuator frame 18 includes opposing sides 20 joined by a top plate 22 and a bottom plate 24. Each side 20 is formed from a pair of vertical slidably movable overlapping inner and outer plates 26, 28. The top plate 22 is fastened to the inner side plates 26 by methods known in the art, such as welding to form a frame upper assembly 17 which supports frame operating components, such as rollers 34, the pinion 42, a motor mount 50, a shaft 44, and the like. The bottom plate 24 is similarly mounted to the outer side plates 28 to form a frame lower assembly 19, and is mounted to the vehicle to secure the actuator 16 to the vehicle floor 11.

The inner side plate 26 is substantially rectangular, and can be cutout to reduce the plate material required. The outer side plate 28 is substantially rectangular, and has upstanding legs 31. The outer plate 28 is open between the legs 31 to provide room for the a shaft 44 and mount 50. Holes 30 are formed in the upstanding legs 31, and are in substantially the same plane as holes 30 formed in the inner plate 26 to allow alignment between a hole 30 in each plate 26, 28.

The height of the frame 18 is adjusted by slidably moving the overlapping plates 26, 28 to obtain the desired height. Each frame side 20 has a lower position, shown in FIGS. 2–4 and 8, and an upper position, with intermediate positions in between. The lower position is accomplished by aligning the lowest hole in the outer overlapping plate 28 on each side of the frame 18 with the lowest hole in the corresponding inner overlapping plate 26, and then pinning the plates 26, 28 together using a pin, such as a bolt 37. The upper position is accomplished by aligning the highest hole in the lower overlapping plate 28 on each side of the frame 18 with the lowest hole in the upper overlapping plate 26, and then pinning the plates 26, 28 together. Intermediate positions, such as the position shown in FIGS. 5–7 and 9, are accomplished by aligning various combinations of the holes 30, and fastening the plates 26, 28 together.

The height of the actuator 16 is fixed by aligning at least one of the holes 30 in the inner plate 26 with a hole 30 in the outer plate 28, and then fastening the plates 26, 28 together. Preferably, bolts or pins are secured in at least one pair of aligned holes 30 to fix the height of the actuator 16. Advantageously, the height adjustable frame 18 provides an easily adaptable actuator 16 for a plurality of applications.

The frame upper assembly supports the channel 14 and the pinion 42 for urging the channel 14 between the extended and retracted positions. In the preferred embodiment, the frame upper assembly includes two pairs of anti-friction members, preferably being two rollers 34 rotatably mounted to the plates 26 on opposing sides of the pinion 42. The rollers 34 engage the U-channel bottom on opposing sides of the rack 40 to support the channel as it slides through the frame. Each pair of rollers 34 are rotatably mounted to the inner plates 26 of the upper frame assembly on opposing sides of the pinion 42.

Figure 10:
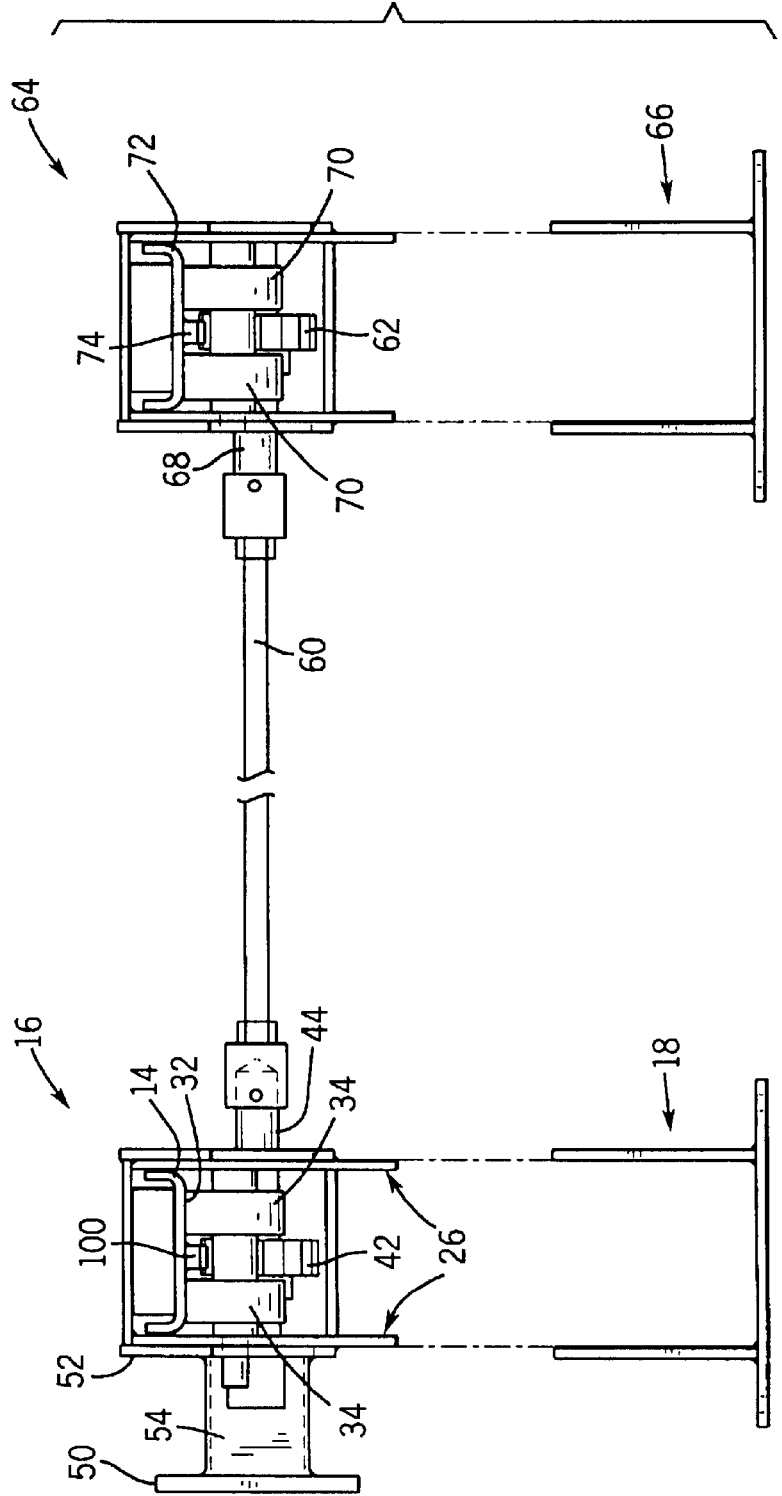
FIG. 10 is a front plan view of the synchronized slide-out actuators of FIG. 1 in which the pinions are coupled by a shaft.

The pinion 42 is mounted to a rotatable shaft 44, journalled to the plates 26, and driven by an electric motor (not shown). The electric motor is mounted to mount 50, which is welded to plate 52. Plate 52 is bolted to plate 26, and shaft 44 extends through plate 26 and terminates in an end 54 which is engageable by the drive means. The opposite end of the shaft 44 may extend through the plate 26 on the opposite side of the frame 18, and have end 56 to be engaged, for example, by a shaft 60 that connects to the pinion 62 of a second slide-out actuator 64, acting as a synchronization mechanism, having a rail support or frame 66, shaft 68, rollers 70, rail member or channel 72 and rack 74, spaced laterally from the unit 16 as illustrated in FIG. 10, so as to synchronize the two units 16 and 64. Although an electric motor is disclosed, the shaft may be driven by other methods known in the art, such as manually.

A low friction block 36, such as UHMW, is mounted to the frame top 22, and engages the U-channel top 38 to keep the pinion 42 engaged with the rack 40. Advantageously, the block prevents the U-channel 14 from pivoting on one of the roller pairs 34 when the channel is substantially fully extended or retracted. Although a block is disclosed, other methods for maintaining the engagement of the rack with the pinion can be used, such as by using rollers, without departing from the scope of the present invention.

While there has been shown and described what are at present considered the preferred embodiments of the invention, it will be obvious to those skilled in the art that various changes and modifications can be made therein without departing from the scope of the invention defined by the appended claims.

Therefore, various alternatives and embodiments are contemplated as being within the scope of the following claims particularly pointing out and distinctly claiming the subject matter regarded as the invention.

I claim:

1. An operating mechanism for extending a slide-out section of a vehicle, said operating mechanism comprising;

a pair of rail supports spaced apart and secured to a vehicle frame;

a pair of rail members connected to the slide-out section, one rail member moveably mounted to each rail support to extend and retract;

a pair of racks, each rack being a separate component from the rail members with one rack being mounted on a longitudinal surface of each rail member;

a pair of pinions, one pinion rotatably mounted to mesh with each rack;

a pair of anti-friction members, at least one anti-friction member mounted to support each rail member in a direction away from the associated pinion; and a shaft connecting the pinions so as to synchronize movement of the rail members with respect to the rail supports.

2. The operating mechanism of claim 1, wherein the anti-friction members are rollers rotatably mounted to the rail supports and engaging bottom surfaces of the rail members.

3. The operating mechanism of claim 2, wherein the rollers define two roller surfaces, one on each side of the associated rack.

4. The operating mechanism of claim 3, wherein there are two pairs of rollers, one pair of rollers mounted so that the associated rack is disposed between one pair of rollers.

5. The operating mechanism of claim 1, wherein the pinions have teeth.

6. The operating mechanism of claim 5, wherein the racks have teeth meshing with the teeth of the pinions.

* * * * *